March 30, 1926.
W. E. GORDON
1,578,656
CROWN BLOCK BOLT
Filed April 14, 1924 — 2 Sheets-Sheet 1
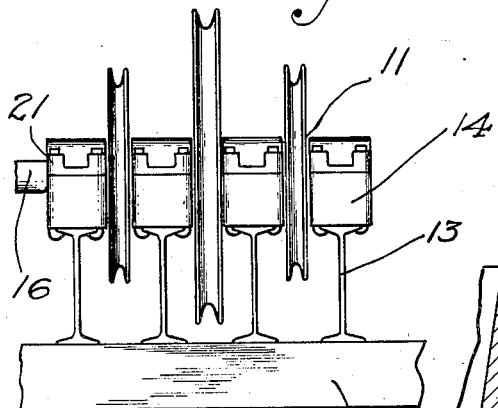
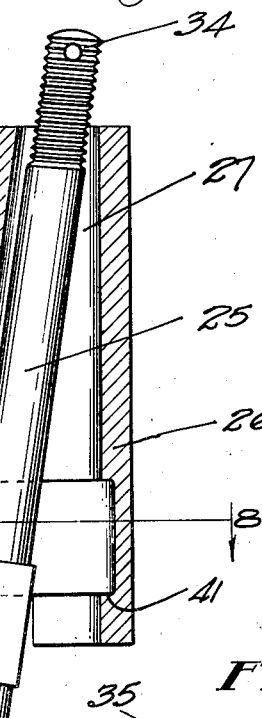
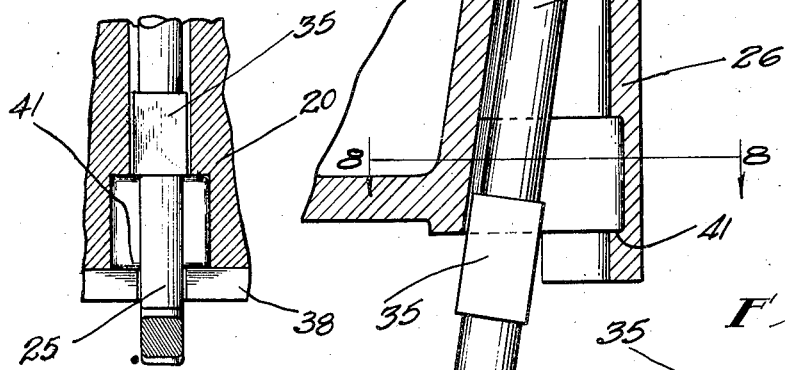
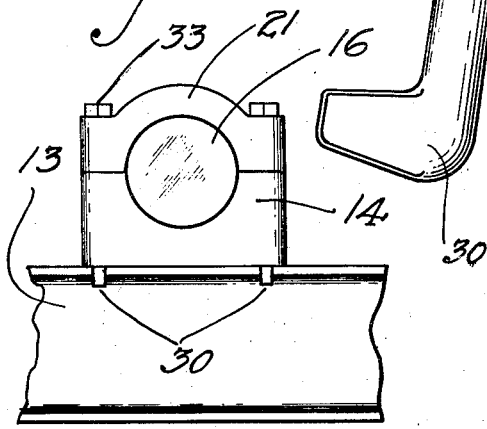
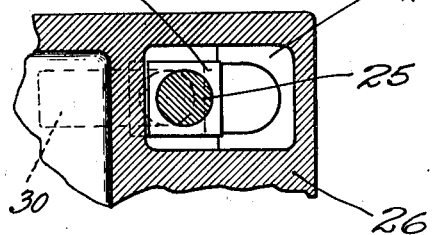
INVENTOR
WILBERT. E. GORDON
BY,
Graham + Lewis
ATTORNEYS.

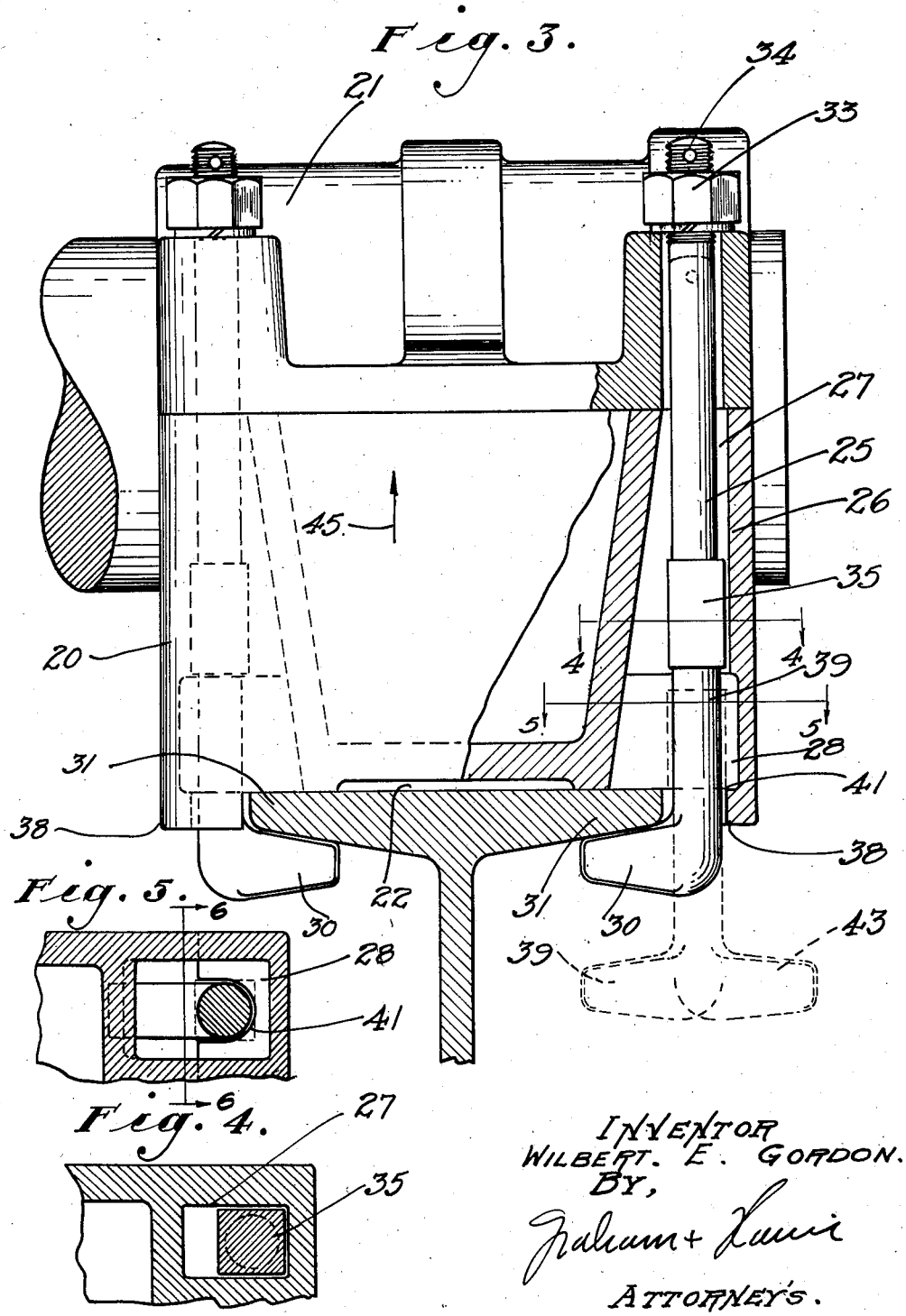

Patented Mar. 30, 1926.

1,578,656

UNITED STATES PATENT OFFICE.

WILBERT E. GORDON, OF LOS ANGELES, CALIFORNIA, ASSIGNOR TO EMSCO TOOL COMPANY, A CORPORATION OF CALIFORNIA.

CROWN-BLOCK BOLT.

Application filed April 14, 1924. Serial No. 706,246.

*To all whom it may concern:*

Be it known that I, WILBERT E. GORDON, a subject of the King of Great Britain, residing at Los Angeles, in the county of Los Angeles, State of California, have invented a new and useful Crown-Block Bolt, of which the following is a specification.

Although my present invention may be referred to as comprising a crown block bolting system, the primary object of this invention being the securing of crown block bearings on I-beams in crown blocks, this invention may be said to relate broadly to means for securing structural or machine parts; and is especially applicable where it is essential that there be no loose parts which may fall from place when they are being assembled or disassembled.

My invention is of particular value for use on crown blocks such as are used in the oil producing industry. These crown blocks are located at the top of the derrick of the well and directly above the floor of the derrick where workmen are busy. A crown block may carry a number of sheaves over which the different elevating cables are passed, these sheaves being commonly mounted on shafts which may be in turn supported by relatively movable bearings. The mentioned bearing members are commonly secured to I-beams which rest on frame elements at the top of the derrick; and when it is necessary to adjust the position of the sheaves, this may be done by shifting the position of the bearings on the I-beams. The falling of bolts or other loose parts from these bearings, when they are being installed or adjusted, has injured workmen working on the derrick floor below the crown block.

It is an object of my invention to provide a securing means in which the bolt members thereof can not fall from place when the members being secured are in contact, or at other inopportune times.

In most of the present types of crown block bearings, it is necessary to entirely remove the bolts from place and to drill new holes therefor in the I-beams, when the bearings have to be moved and it is another object of this invention to provide a means for securing one member to another without the drilling of bolt holes and which allows the position of the members to be changed without entirely removing the bolts.

It is another object of my invention to provide an adjustable bolting means which will allow the secured member to be removed from the supporting member without having to slide it along the face thereof.

Further objects of the invention and the especial advantages thereof will be made evident hereinafter.

Referring to the drawings which are for illustrative purposes only,

Fig. 1 is a diagrammatic view of a crown block showing an application of my invention.

Fig. 2 is a side view of one of the bearings of a crown block including features of my invention.

Fig. 3 is an enlarged end view of the bearing, partially sectioned.

Fig. 4 is a section taken on the line 4—4 of Fig. 3.

Fig. 5 is a section taken on the line 5—5 of Fig. 3.

Fig. 6 is a section taken on the line 6—6 of Fig. 5.

Fig. 7 is a fragmentary view showing how the bolts may be removed from the bearing after it has been lifted from place on the supporting I-beam.

Fig. 8 is a section taken on the line 8—8 of Fig. 7.

As shown in Fig. 1, a crown block 11, is placed on the top of a derrick 12. This crown block comprises I-beams 13, on which bearings 14 are secured for supporting shafts 16, the shafts 16 being shown as supporting sheaves 17. My invention is shown as employed for mounting the mentioned bearings on the I-beams 13.

As shown in Fig. 3, the bearing members may each comprise a body 20 and a cap 21, resting on the upper face 22 of one of the I-beams 13; and four of my novel bolts 25, may be used for mounting each bearing on its supporting I-beams. Each of the bolts 25 is shown as extending through a cavity 26 formed in the body 20 and also through the hole 19 in a cap 21. Each cavity 26 is shown as comprising a rectangular portion 27 and a relieved or enlarged portion 28, and the bolts 25 may each have an L-head 30 formed on the lower end thereof and arranged to engage the lower face of the adjacent flange 31 of a cooperating I-beam 13, to clamp the bearing 14 thereto. The clamping action referred to may be effected by nuts 33 shown as threaded on the upper ends 34 thereof, a split washer being thereby engaged tightly against a cap 21.

Before the heads 30 engage the flanges 31, the squared portions 35 formed on the bolts 25 are disposed in the rectangular portions of the cavity 26, and thereby prevent the turning of the bolts 25; and the described arrangement practically prevents any possibility of either the nuts 33 or the bolts 25 being lost or becoming disengaged from the flanges 31, although the bearing 14 may be readily moved along the I-beams 13, upon a slight loosening of the bolts 25, such as to free the heads 30 from engagement with the flanges 31; and projections 38 may serve as guides to hold the bearing centrally upon the beam 13, and they may serve to prevent accidental dropping of a bolt.

The bearing 14 may be bodily removed from the beam 13 by unscrewing the nuts 33, thus allowing the bolts 25 to descend to the extent indicated by the dotted line 39 in Fig. 3. The bolts 25 are prevented from dropping any further by engagement of the shoulders 41, which are formed at the lower ends of the cavity 26, with the squared portions 35 of the bolts 25. The squared portions however rest when lowered, in the enlarged portions 28, which are large enough to allow the bolts to be turned; and when the bolts are turned a half a revolution, the heads 30 being outwardly directed, as indicated by the dotted lines 43, Fig. 3, the bearing is ready to be lifted entirely from the beam 13 and it may be removed therefrom in the direction of the arrow 45 in Fig. 3, it not being necessary to slide the bearing along the I-beam when the heads of the bolts are turned so that they can clear the same.

From the drawings, it will be seen that the shoulders 41 are formed at the outer parts of the lower end of the cavities 26. It will also be seen that the outer edges of the flanges 31 normally hold the lower ends of the bolts in the outer portions of the cavities, so that the squared portions will be engaged by the shoulders 41 when the nuts 33 are removed.

After a bearing 14 has been entirely removed from an I-beam, the bolts 25 may be removed from the cavities 26 in the general manner shown in Fig. 7. The lower ends of the bolts may be swung inwardly to the position shown in this figure, thereby moving the squared portions 35 to the inside of the shoulders 41 so that they will freely pass the same.

It is not intended that my invention be limited to use in connection with crown block bearings, said invention being suitable for use wherever the above mentioned features are desired; but any form of my invention may assume primary and secondary members (such as the mentioned I-beams and bearing blocks, respectively) which are to be secured together by an especially designed bolt.

It is believed that this invention may be found suitable for various uses in connection with structural or machine parts which are to be secured together or to suitable frames or foundations and although, I have herein described one complete embodiment of my invention, it will be understood that various features thereof might be independently employed and also that various modifications might be made by those skilled in the art, without the slightest departure from the spirit and scope of my invention, as the same is indicated above and in the following claims.

I claim as my invention:

1. In means for securing together a primary member provided with an extending flange and a secondary member having a cavity extending therethrough, the combination of: a bolt extending through said cavity having a head formed on the lower extremity thereof; means for pulling said head against said flange in a manner to clamp said primary and secondary members together; means integral with said bolt engaging said secondary member for preventing the turning of said bolt in said secondary member when said head is against said flange; and means for preventing the accidental removal of said bolt from said cavity when said primary and secondary members are in contact.

2. In means for securing together a primary member provided with an extending flange, and a secondary member having a cavity extending therethrough, said flange of said primary member extending at right angles to the extension of said cavity, the combination of: a bolt extending through said cavity having a head formed on the lower extremity thereof; means for pulling said head against said flange in a manner to clamp said primary and secondary members together; means integral with said bolt, engaging said secondary member for preventing the turning of said bolt in said secondary member when said head is against said flange; and means for preventing the accidental removal of said bolt from said cavity when said primary and secondary members are in contact.

3. In means for securing together a primary member provided with an extending flange and a secondary member having a cavity extending therethrough, the combination of: a bolt extending through said cavity having a head formed on the lower extremity thereof; means for pulling said head against said flange in a manner to clamp said primary and secondary members together; means integral with said bolt, engaging said secondary member for preventing the turning of said bolt in said secondary member when said head is against said flange, said means comprising a squared portion located on said bolt and arranged to be engaged by a constricted portion of said cavity when said head is against said flange; and means for preventing the accidental removal of said bolt from said cavity when said primary and secondary members are in contact.

4. In means for securing together a primary member provided with an extending flange and a secondary member having a cavity extending therethrough, the combination of: a bolt extending through said cavity having a head formed on the lower extremity thereof, and a squared portion formed thereon; means for pulling said head against said flange in a manner to clamp said primary and secondary members together; means for preventing the turning of said bolt in said secondary member when said head is against said flange; and means for preventing the accidental removal of said bolt from said cavity when said primary and secondary members are in contact, said preventing means comprising a shoulder formed at the lower part of said cavity arranged to engage said squared portion of said bolt when said pulling means is removed.

5. In means for securing a secondary member having a cavity of elongated cross section extending therethrough to a primary member having a flange extending in a plane substantially perpendicular to the axis of said cavity; a bolt member extending through said cavity having a head formed on one end thereof; means for clamping said head against said flange in a manner to clamp said primary and secondary members together; means for preventing the turning of said bolt when said head is against said flange; and means for preventing the removal of said bolt from said elongated cavity when said bolt rests in the outer portion of said elongated cavity, said bolt being held in said outer portion of said cavity by said flange when said primary and secondary members are together.

6. In means for clamping a secondary member having a cavity formed therethrough to a primary member having an extending flange; a bolt member extending through said cavity and engaging said flange of said primary member for clamping together said primary and secondary members; a rectangular portion formed on said bolt and arranged to rest in a cooperating constricted portion of said elongated cavity when said bolt is engaging said flange; for preventing rotation of said bolt; and a shoulder formed near one end of said cavity adjacent to said primary member for preventing the removal of said bolt when said bolt is in the outer portion of said elongated cavity, said shoulder providing an abutment face against which said rectangular portion will engage, said bolt being retained in the outer portion of said cavity by said flange when said primary and secondary members are in contact.

7. In combination: a primary member; a secondary member adapted to be secured to said primary member; a bolt extending through a cavity formed in said secondary member, and adapted to engage said primary member; means for causing said bolt to secure said primary and secondary members together; and means adapted to prevent a removal of said bolt even though said means for causing said bolt to secure said primary and secondary members together is removed.

8. In combination: a primary member; a secondary member adapted to be secured to said primary member; a bolt extending through a cavity formed in said secondary member, and adapted to engage said primary member; means for causing said bolt to secure said primary and secondary members together; and means adapted to prevent a removal of said bolt while said primary and secondary members are in position to be secured together even though said means for causing said bolt to secure said primary and secondary members together is removed.

9. In combination: a primary member; a secondary member adapted to be secured to said primary member; a bolt extending through a cavity formed in said secondary member, and adapted to engage said primary member; means for causing said bolt to secure said primary and secondary members together; a shoulder formed near the lower part of said cavity; and an enlarged portion formed on said bolt adapted to engage said shoulder in order to prevent a removal of said bolt even though said means for causing said bolt to secure said primary and secondary members together is removed.

10. In combination: a primary member; a secondary member adapted to be secured to said primary member; a bolt extending through a cavity formed in said secondary member, and adapted to engage said primary member; means for causing said bolt to secure said primary and secondary members together; a shoulder formed near the lower part of said cavity; and an enlarged portion formed on said bolt adapted to engage said shoulder in order to prevent a removal of said bolt while said primary and secondary members are in position to be secured together even though said means for causing said bolt to secure said primary and secondary member together is removed.

11. In combination: a primary member; a secondary member adapted to be secured to said primary member; a bolt extending through a cavity formed in said secondary member, and adapted to engage said primary member; means for causing said bolt to secure said primary and secondary members together; a shoulder adapted to extend under a portion of said cavity; and an enlarged portion formed on said bolt, said enlarged portion being adapted for engaging said shoulder and preventing said bolt from being removed from place when said primary and secondary members are in position to be secured together even though said means is removed.

12. A combination as defined in claim 11 in which said secondary member holds said bolt in such a position that said enlargement will be capable of engaging said shoulder, said bolt being adapted to be swung so as to avoid contact with said shoulder when said primary and secondary members are not in position suitable for being secured together.

13. In combination: a primary member having a cavity formed therethrough; a shoulder adapted to obstruct a portion of said cavity; an element adapted to extend through said cavity; an enlargement formed on said element; and a secondary member adapted to hold said element in such a position in said cavity that said enlargement cannot pass out of said cavity by said shoulder.

In testimony whereof, I have hereunto set my hand at Los Angeles, California, this 31st day of March, 1924.

WILBERT E. GORDON.